United States Patent [19]

Thrift et al.

[11] Patent Number: 5,072,914

[45] Date of Patent: Dec. 17, 1991

[54] RAILWAY FREIGHT CAR COUPLER LIFT

[76] Inventors: Jimmie R. Thrift, 5426 Valdosta Hwy., Waycross, Ga. 31501; Nass Hendley, 201 William St., Homerville, Ga. 31634

[21] Appl. No.: 549,977

[22] Filed: Jul. 9, 1990

[51] Int. Cl.[5] .............................................. B23Q 19/04

[52] U.S. Cl. .............................................. 254/100

[58] Field of Search .............................. 254/98-103, 254/7 R, 7 B, 7 C, 10.5; 29/256, 259, 227

[56] References Cited

U.S. PATENT DOCUMENTS

| | | | |
|---|---|---|---|
| 251,415 | 12/1881 | Crecelius | 254/98 |
| 632,197 | 8/1899 | Olsen | 254/98 |
| 2,013,918 | 9/1935 | Kelleher | 254/98 |
| 4,502,197 | 3/1985 | Harder | 29/259 |
| 4,872,644 | 10/1989 | Papapetras | 29/227 |

*Primary Examiner*—Robert C. Watson
*Attorney, Agent, or Firm*—Arthur G. Yeager

[57] ABSTRACT

A lifting device powered by an impact wrench, specifically designed to raise a on car railway freight car coupler. The embodiment of the invention disclosed herein comprises:

A base plate that houses a load bearing that a lifting screw rod fits into and rotates on. A top plate that houses a pilot bearing that the screw rod passes through and is held vertical by, thereby stabilizing load being lifted. Four stachion rods that connect the top and bottom plates forming the coupler lift body.

A lifting block with carrying handle that threads onto the screw rod with an attached arm that engages the freight car coupler. The lifting block is powered up and down the screw rod by applying an impact wrench to the attached socket at top of same.

2 Claims, 4 Drawing Sheets

RAILWAY FREIGHT CAR COUPLER LIFT

BACKGROUND—FIELD OF INVENTION

This invention relates to tools, used by the railroad industry, to repair freight car couplers.

BACKGROUND—DESCRIPTION OF PRIOR ART

The device which links railway freight cars together, the coupler, is attached to the freight car by a steel pin or cross key. The weight of the coupler is supported by a angle iron or a bar of steel, called a coupler carrier. The carrier also regulates the height of the coupler from the rail, which has specific limitations. When the coupler carrier wears from movement of the coupler, the coupler becomes low and out of vertical alignment. This is corrected by lifting the coupler and applying a shim to the coupler carrier. This application corrects coupler height.

The methods used now to lift the coupler varys, the most used is the fork lift truck. Some repair facilities use any lifting device available.

The average coupler weighs approximately five hundred and fifty pounds. The coupler has to be lifted about six to eight inches for application of the coupler carrier shim. Using a fork lift truck is not economical or safe for this job. The fork lift truck is not designed to lift couplers. Often the car technician has to wait for a fork lift truck and operator to become available. Jacks that are now being used are all purpose lifting devices, heavy and not designed for this job. A coupler lift that was used in the past was made of wood and worked on the principle of the lever, with a steel latching device. This proved to be a very unsafe tool and was discontinued.

Observation of methods now used to lift couplers are; unsafe, consumes too much time, strenuous to car technician.

OBJECTS AND ADVANTAGES

Accordingly, we claim the following as our objects and advantages of the invention:

(a) a light weight lifting device weighing approximately twenty eight pounds, with a convenient carrying handle, easily carried with one hand;

(b) a tool specifically designed to lift a freight car coupler;

(c) a lift which has no motors or hydraulic pumps permanently attached for power;

(d) a tool which is fast and will lift a freight car coupler for shim application in approximately eight seconds;

(e) a lift that gets its power source from a tool used at all freight car repair facilities, a one-half inch drive impact wrench, electric or air powered;

(f) this lift can be operated manually by using a ratchet wrench;

(g) a safe tool which keeps load positioned when power is stopped;

(h) a lift that is designed with a no slip lifting arm;

(i) a tool that works on a time proven principle, the screw;

(j) a lifting device being novel in appearance and easily operated will be acceptable to railway car technicians;

(k) it is compact, stands upright and needs very little space for storage;

(l) this lift has a lifting height capacity of approximately twenty two inches, further advantages will become apparent after consideration of the accompanying description and drawings.

DETAILED DESCRIPTION OF THE ILLUSTRATED EMBODIMENT

FIGS. 1 to 8

Figure 1:
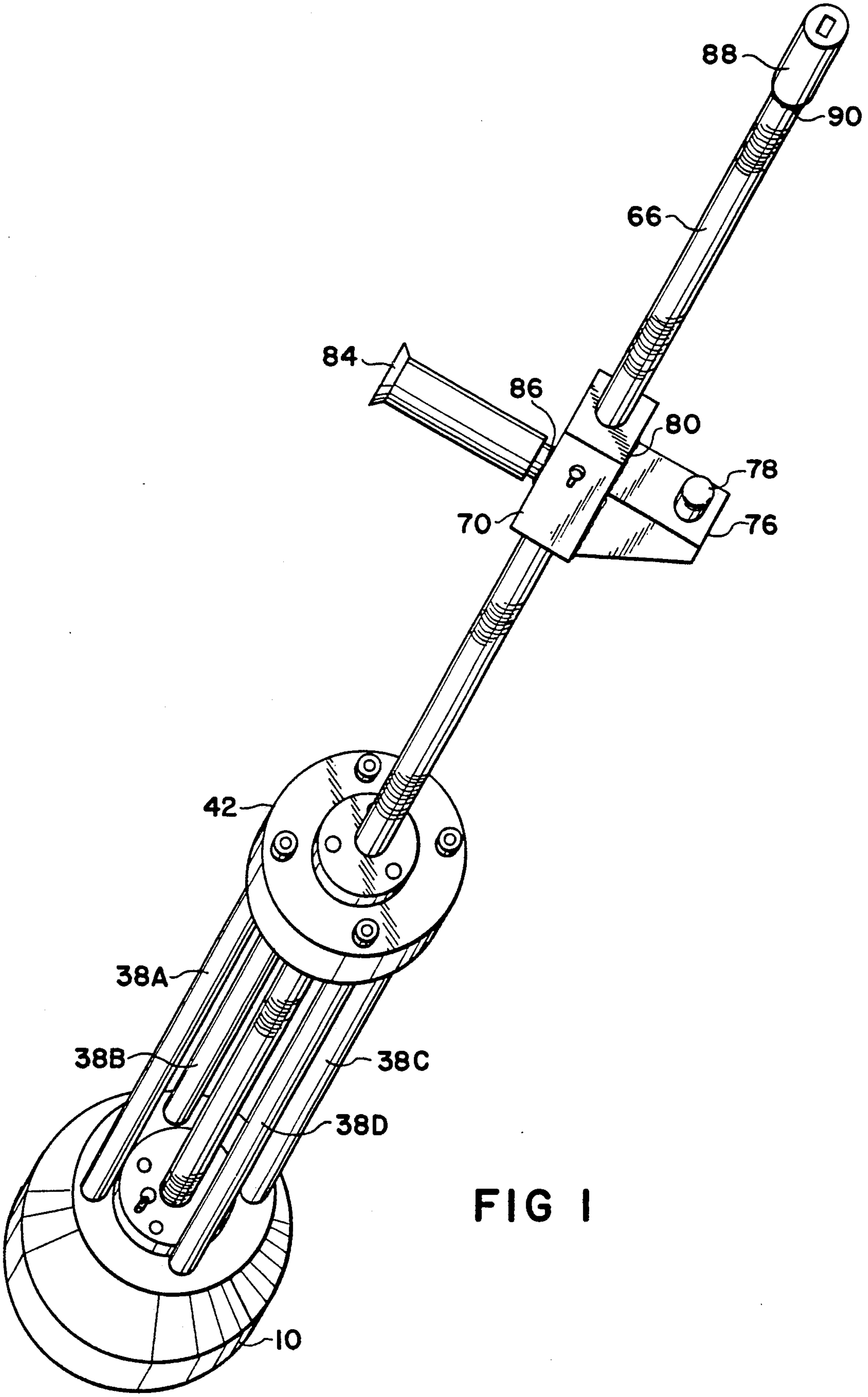
FIG. 1 shows a perspective view of our invention, the railway freight car coupler lift.
Figure 2:
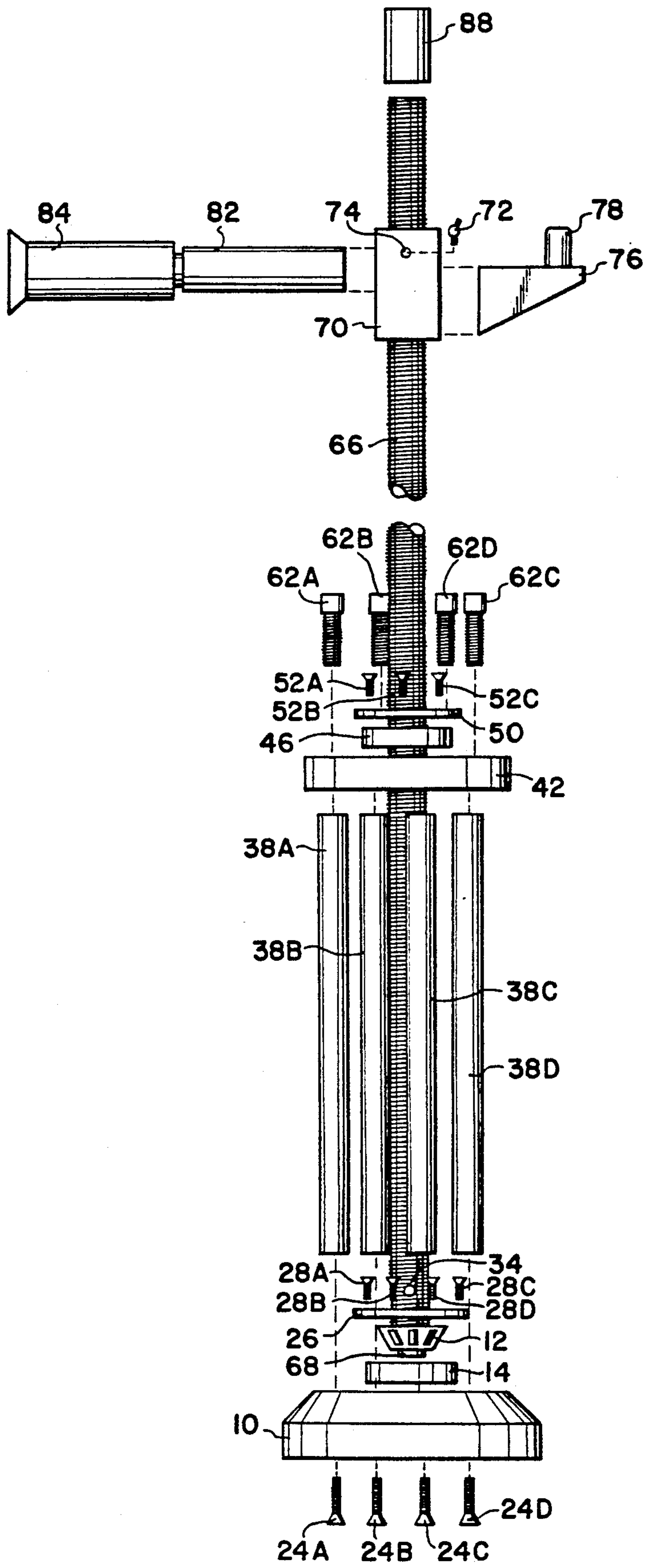
FIG. 2 shows a exploded view of coupler lift in FIG. 1.

A typical embodiment of our invention is illustrated in FIG. 1, the base plate 10 is a disk machined from billet alluminum, eight inches in diameter and two inches thick FIG. 2. The top edge of 10 is tapered for appearance and to reduce weight. In the center of base 10 is the load bearing race seat 16 which is a machined recess two and one eighths inches in diameter and one inch in depth FIG. 3A. The load bearing race 14 FIG. 2 is two and one eighths in diameter and seven eighths inch thick, and is pressed into seat 16. In the center of load bearing race seat 16, is the lifting screw spindle recess 18 FIG. 3B, which is one inch in diameter and three quarters inch deep allowing a relief area for end of lifting screw spindle 68 FIG. 2. 68 is the bottom end of lifting screw 66 FIG. 2 turned to three quarter inch plus one thousands oversize in diameter and one and one quarter inch in length. The load bearing 12 FIG. 2 is a heavy duty tapered roller bearing with a three quarter inch shaft hole. This bearing is pressed onto spindle 68 of lifting screw 66 FIG. 2.

Bearing 12 fits into and rotates on load bearing race 14 FIG. 2. The base plate stanchion rod recesses 20 A, B, C, and D FIG. 3B are recessed one inch plus three thousands inch in diameter and one half inch deep. They are spaced equally around a four and three quarter inch circle in top of base plate 10 FIG. 3B. Into these recesses fit the stachion rods 38A, B, C, and D FIG. 2. These aluminum rods are twelve inches in length and one inch in diameter with each end drilled and tapped to receive base plate stachion rods bolts 24A, B, C, and D FIG. 2, and top plate stachion rod bolts 62 A, B, C, and D FIG. 2.

The base plate stachion rod bolts 24 A, B, C, and D are flat headed standard thread allen type bolts, two and one half inches long by one half inch in diameter FIG. 2. These bolts fit into base plate counter sunk stachion rod bolt holes 22A, B, C and D FIG. 3C. These one half inch holes are drilled through center of stachion rod recesses 20 A, B, C and D FIG. 3B. Bolts 24 A, B, C, and D thread into matching tapped holes 40 A, B, C, and D, for base plate stachion rod bolts FIG. 4, these are drilled and tapped one and one quarter inches deep into bottom of stachion rod ends.

The load bearing cover 26 is a disk of aluminum three and nine sixteenths inches in diameter and three sixteenths thick FIG. 2. In the center of 26 is the load bearing cover center hole 27, FIG. 7B. This hole is one and one thirty second inches in diameter. Lifting screw 66 passes through this hole FIG. 2. Spaced equally on a two and fifteen sixteenths inch circle around edge of load bearing cover 26 is the load bearing cover counter sunk screw holes 30 A, B, C, and D FIG. 7B. The load bearing cover screws 28 A, B, C, and D are standard thread allen type flat head screws, one half inch long and one quarter inch in diameter FIG. 2. These screws pass through cover holes 30 A, B, C, and D FIG. 7B, and screw into matching tapped holes for load bearing cover screws 32 A, B, C, and D in base plate 10 FIG. 3B. The load bearing grease fitting 34 FIG. 2 threads into tapped hole 36 on load bearing cover 26 FIG. 7B.

The top plate 42 is a disk machined from billet aluminum six inches in diameter and one inch thick FIG. 2. In the center of 42 is the pilot bearing seat 48 FIG. 5A. This is a machined recess one and thirty one thirty seconds inch in diameter and one half inch deep. The pilot bearing 46 is a one piece sealed ball bearing one and thirty one-thirty seconds inch in diameter and one half inch thick, FIG. 2. 46 is pressed into pilot bearing seat 48 FIG. 5A. Pilot bearing 46 has a shaft hole diameter that allows lifting screw 66 to pass through freely, FIG. 2. The top plate center hole 44 is a hole one and one thirty seconds in diameter in the center of top plate 42 FIG. 5B, that lifting screw 66 passes through FIG. 2.

The pilot bearing cover 50, is a disk of aluminum three inches in diameter and three sixteenths inch thick, FIG. 2. Pilot cover 50 has a center hole 51, FIG. 6B with a diameter of one and one thirty second inches, which lifting screw 66 passes through, FIG. 2. Spaced equally around cover 50 on a two and one quarter inch circle are the pilot bearing cover counter sunk screw holes 54 A,B,C, FIG. 6B. The pilot bearing cover screws 52 A, B, C, are standard thread allen type flat head one half inch long and one quarter inch in diameter, FIG. 2. These screws pass through cover holes 54 A, B, C, FIG. 6B, and screw into matching tapped holes for pilot bearing cover screws 56 A, B, C, in top plate 42 FIG. 5B.

Figure 5A:
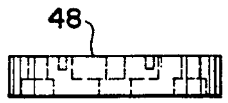
FIG. 5A shows a side view of top plate.
Figure 5B:
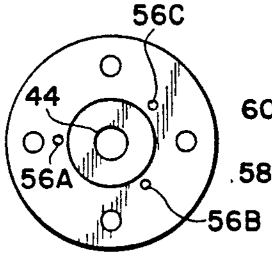
FIG. 5B shows a top view of top plate.
Figure 5C:
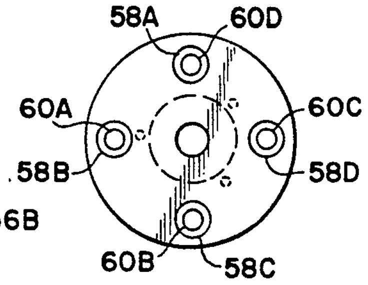
FIG. 5C shows a bottom view of top plate.
Figure 6A:
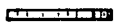
FIG. 6A shows a side view of pilot bearing cover.
Figure 6B:
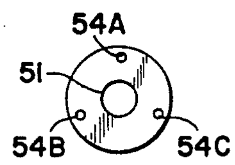
FIG. 6B shows a top view of pilot bearing cover.
Figure 7A:
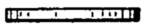
FIG. 7A shows a side view of load bearing cover.
Figure 7B:
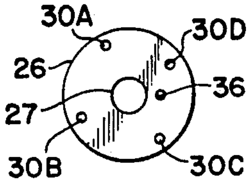
FIG. 7B shows a top view of load bearing cover

The top plate stachion rod recesses 58 A,B,C, and D FIG. 5C are recesses one inch plus three thousands inch in diameter and one half inch deep. They are spaced equally around a four and three quarter inch circle in bottom of top plate 42 FIG. 5C. Into these recesses fit stachion rods 38 A,B,C, and D FIG. 2, connecting top plate 42 to base plate 10 FIG. 1. The top plate stachion rod bolt holes 60 A,B,C, and D FIG. 5C are one half inch diameter holes drilled through center of top plate stachion rod recesses 58 A,B,C, and D FIG. 5C. The top plate stachion rod bolts 62 A, B,C, and D FIG. 2, are standard thread allen head cap screws one and one half inches long and one half inch in diameter. These bolts fit into bolt holes 60 A,B,C, and D FIG. 5C, and thread into tapped holes 64 A,B,C, and D for top plate stachion rod bolts FIG. 4.

The lifting screw 66 is forty one and one half inches long and one inch in diameter, FIG. 2. 66 has acme type threads five per inch and is made of forty one forty grade steel. The lifting block 70 FIG. 2, is also made from a bar of forty one forty grade steel three inches long and two by two inches square. Lifting block 70 has threads that match and thread onto lifting screw 66 FIG. 2.

The lifting arm 76 FIG. 2 is three inches long and one and three quarters by one and three quarters inch square at end that connects to lifting block 70, FIG. 1. The bottom edge of arm 76 tapers upward from lifting block 70 to a end width of five eights inch, FIG. 2. Arm 76 attaches to block 70 by weld 80 that applies to all sides, FIG. 1. Machined onto top outer end of lifting arm 76 is the no-slip stud 78. This projection is one inch long and seven eights inches in diameter, FIG. 2. 78 fits into the coupler knuckle flag hole 96, FIG. 8. This vertical hole is one and one eighth inch in diameter and passes completely through the coupler knuckle.

The carrying handle 82 is a section of pipe five inches long with a out side diameter of seven eights inch, FIG. 2. Carrying handle 82 attaches to lifting block 70 by attachment weld 86, FIG. 1, and is applied completely around end of handle 82 that contacts block 70, FIG. 1.

The carrying handle grip 84, FIG. 2 is made of rubber and slips over handle 82, FIG. 1.

At the top of lifting screw 66, FIG. 1 is the one half inch drive impact wrench socket 88. This socket attaches by weld 90 to screw 66 and applies completely around its diameter, FIG. 1. The lifting block grease fitting 72 threads into the tapped counter sunk hole 74 on side of lifting block 70, FIG. 2.

Figure 8:
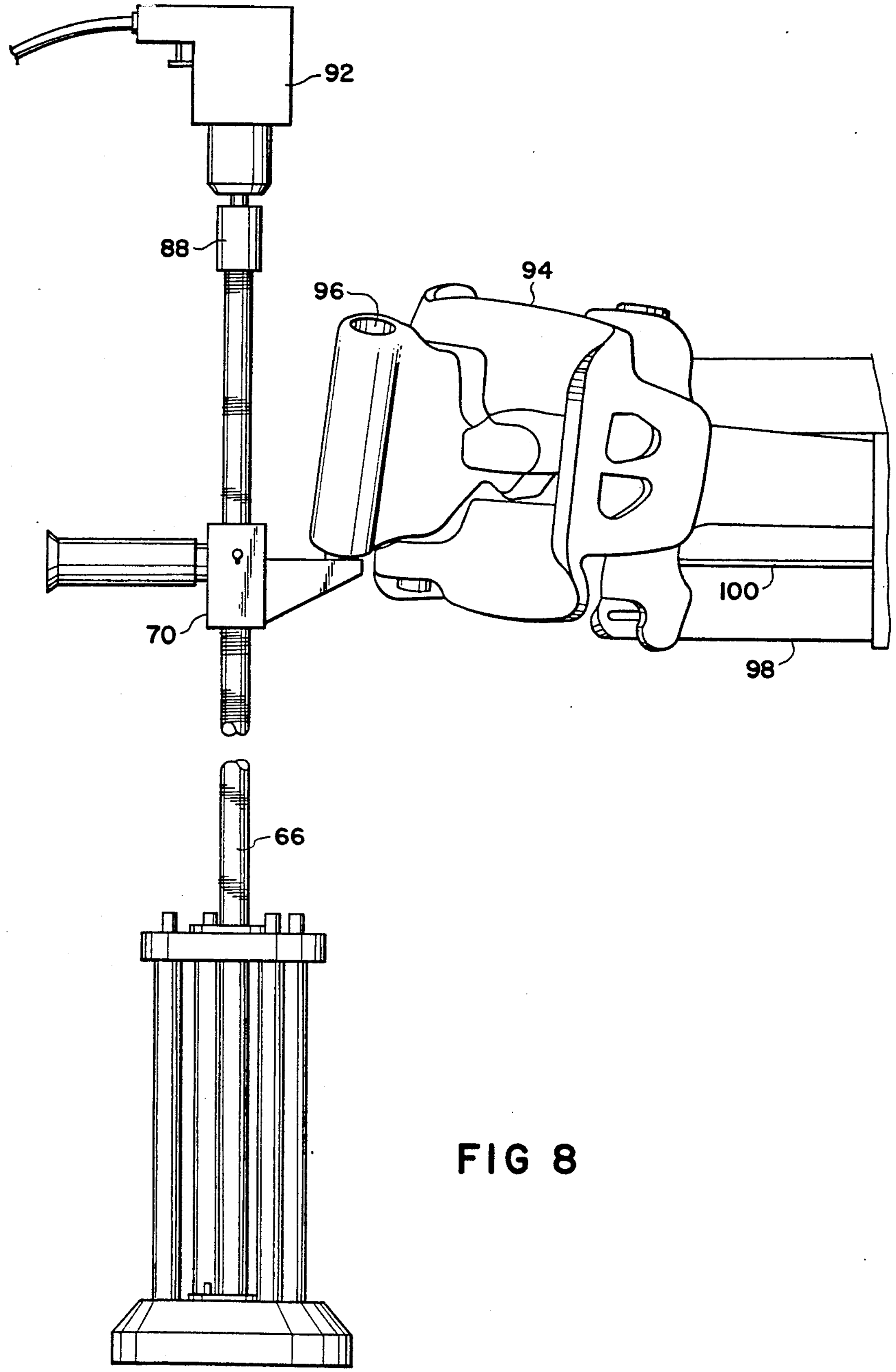
FIG. 8 shows the coupler lift applied to coupler.

The freight car coupler 94, FIG. 8 weighs approximately five hundred and fifty pounds. This device links the railway freight cars together. FIG. 8 also shows coupler 94 with our invention applied and in the raised position, allowing repairs to coupler carrier 98, FIG. 8. This angle or bar of steel supports the weight of coupler 94. The coupler carrier shim 100, FIG. 8 is a flat bar of metal varying in length and thickness, and is applied and attached by weld to carrier 98, FIG. 8. This compensates for wear from coupler movement. FIG. 8 shows impact wrench 92, which is the unique power source for our invention, and can be either air or electric. Although a larger impact wrench could be used a one half inch drive is sufficient.

OPERATION OF INVENTION—FIGS. 2, 8

The method used to power our invention is an impact wrench. Although unconventional it is very convenient. Designed to with stand the hammering effect of the impact wrench this tool is very durable. An alternative method of operation could be a hand rachet.

FIG. 8 shows the railway freight car coupler 94 on car with our invention applied and coupler lifted. This is accomplished by placing the coupler lift under coupler with one hand. A one half inch drive impact wrench 92, FIG. 8 is applied to lifting screw impact wrench socket 88 FIG. 8, and lifting block 70 FIG. 8 is powered upward by turning screw 66 clockwise, FIG. 8.

The lifting arm no-slip stud 78, FIG. 2 is secured in bottom of coupler knuckle flag hole 96, FIG. 8. This hole passes completely through knuckle. The coupler can then be raised in approximately eight seconds. With power stopped load remains stationary, allowing application of coupler carrier shim 100, FIG. 8, to the carrier 98, FIG. 8. The coupler is then lowered by reversing impact wrench completing operation.

OPERATION AND FUNCTION OF PARTS

The base plate 10, FIG. 2 serves as a foundation for the coupler lift and bearing housing for load bearing 12, FIG. 2. This bearing supports the load being lifted. It is a heavy duty tapered roller bearing and is pressed onto the lifting screw spindle 68, FIG. 2. The load bearing race 14, FIG. 2 is pressed into load bearing race seat 16, FIG. 3A, which is machined into base 10 providing load bearing 12, FIG. 2, a surface to revolve on.

Figure 3A:
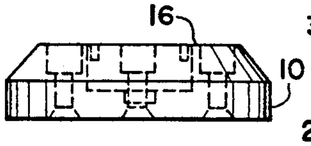
FIG. 3A shows a side view of base plate.
Figure 3B:
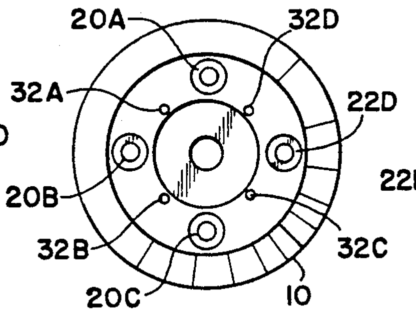
FIG. 3B shows a top view of base plate.
Figure 3C:
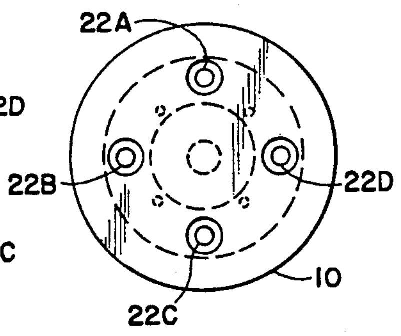
FIG. 3C shows a bottom view of base plate.
Figure 4:
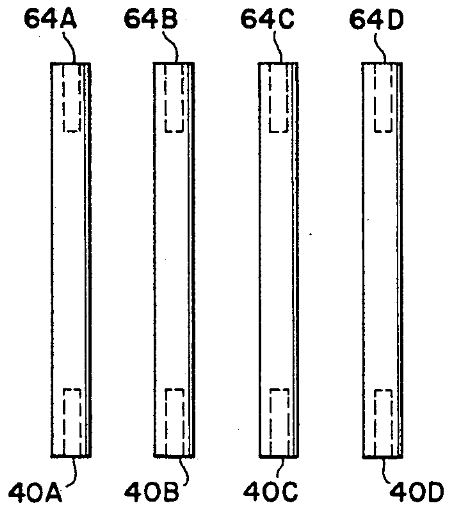
FIGS. 4 A, B, C, D shows a side view of stachion rods.

In the center of seat 16, FIG. 3A is the lifting screw spindle recess 18, FIG. 3B, this provides a relief area for the end of lifting screw spindle 68, FIG. 2. It also serves as a grease reservoir for load bearing 12, FIG. 2. Spaced evenly around top of base 10 are the base plate stachion rod recesses 20A, B, C, and D, FIG. 3B. Stachion rods 38A, B, C, and D fit into these recesses adding stability to the coupler lift, FIG. 1. These stachions also connect base plate 10 to top plate 42, FIG. 1.

Drilled into bottom of base 10 are the base plate counter sunk stachion rod bolt holes 22A, B, C, and D FIG. 3B, allowing a flush fit for base plate stachion rod bolts 24A, B, C, and D, FIG. 2. These holes penetrate into bottom of base plate stachion rod recesses 20A, B, C, and D, FIG. 3B, allowing base 10 to be connected to stachions 38A, B, C, and D, FIG. 1. These bolts pass through holes 22A, B, C, and D, FIG. 3C, and thread into tapped holes 40A, B, C, and D in stachion rod ends, FIG. 4. The load bearing cover 26 encircles lifting screw 66 and serves as a grease seal for load bearing 12, FIG. 2. Load bearing cover screws 28A, B, C and D FIG. 2, pass through load bearing cover screw holes 30A, B, C, and D, FIG. 7B, and thread into tapped load bearing cover screw holes 32A, B, C, and D, in base plate 10, FIG. 3B securing load bearing 12 and lifting screw 66 to base 10, FIG. 1. The load bearing grease fitting 34, FIG. 2 serves as a means to lubricate load bearing 12 and threads into tapped hole 36 in load bearing cover 26, FIG. 7B.

The top plate 42, FIG. 2 houses pilot bearing 46, FIG. 2. Lifting screw 66 passes through bearing 46, FIG. 2, and top plate center hole 44, FIG. 5B, and connects with base plate 10 FIG. 1. The pilot bearing 46 is a sealed roller bearing and keeps lifting screw 66 and load being lifted centered over load bearing 12, FIG. 2. Bearing 46 is pressed into the pilot bearing seat 48, FIG. 5A, which is machined into top plate 42, FIG. 2. The pilot bearing cover 50 encircles lifting screw 66 and serves as a cover for pilot bearing 46, FIG. 2 Pilot bearing cover screws 52A, B, C, FIG. 2, pass through pilot bearing cover screw holes 54 A, B, C, FIG. 6B and thread into tapped pilot bearing screw holes 56A B, C, FIG. 5B in top plate 42 securing cover 50 to plate 42, FIG. 1. Spaced evenly around bottom of top plate 42 are the top plate stachion rod recesses 58A, B, C, and D, FIG. 5C. Stachion rods 38A, B, C, and D, FIG. 2, fit into these holes adding strength and stability to the coupler lift. Drilled into top plate 42 are the top plate stachion rod holes 60A, B, C, and D, FIG. 5C. These penetrate into recesses 58 A, B, B, and D, FIG. 5C, allowing top plate 42 to be connected to stachions 38A, B, C and D, FIG. 1, by top plate stachion rod bolts 62A, B, C, and D, FIG. 2, which pass through holes 60 A, B, C, and D, FIG. 5C, and thread into tapped holes 64A, B, C, and D in stachion rod ends, FIG. 4, completing the connection of base plate 10 to top plate 42, FIG. 1.

The lifting screw 66, FIG. 2, gives the coupler lift the mechanical advantage needed to perform its job. The lifting block 70, FIG. 2 threads onto screw 66 and is powered up and down screw 66 by impact wrench 92, FIG. 8, which fits into lifting screw impact socket 88, FIG. 8. This socket attaches to screw 66 by weld 90, FIG. 1. Attached to block 70 by weld 80, FIG. 1, is the lifting arm 76, FIG. 1, which supports load being lifted, FIG. 8. Machined onto lifting arm 76 is the lifting arm no-slip stud 78, FIG. 1. This projection which is slightly beveled at the top to facilitate application fits into the coupler knuckle flag hole 96, FIG. 8, of the freight car coupler 94, FIG. 8, securing coupler lift to coupler FIG. 8.

For convenience of lubrication purposes a lifting block grease fitting 72, FIG. 2 is counter sunk and tapped into hole 74, FIG. 2, on side of lifting block 70, FIG. 2. This prevents the grease fitting from being broken off during use.

Attached to block 70 by weld 86, FIG. 1, is the carrying handle 82, FIG. 2, it has a rubber grip 84, FIG. 2, allowing the coupler lift to be carried without slipping from hand.

SUMMARY, RAMINIFICATIONS, AND SCOPE

Accordingly the reader will see the advantage this tool has over the existing methods now used.

Our invention eliminates the need of a fork lift truck and its operator. Eliminates lifting devices with permanently attached motors or pumps for power. Also eliminates the use of dangerous jack levers, cranks and jacks with tricky tripping devices.

Our invention provides a light weight easily handled, uniquely powered lifting device. We declare our tool to be pleasing to the eye and interesting in design. Also, being specially designed for this particular job makes it a safer tool over improvized methods.

Although our description and drawings contain many definite described demensions and shapes, this sould not lead the reader to believe this is the limitations of the invention. At the present this is the preferred embodiment, but it could be changed. For example; the height of the lifts body could be changed by simply lengthing the stachion rods. Another example, the base parts could be eliminated substantially by using a one piece casting! Also, the lifting capacity could be increased or decreased by using a screw with different diameter and threads. Theoretically the lifting arm could be changed. Adapting the invention to other applications.

Therefore the scope of our invention does not end with this tested proven model, but continues by being flexible in design. We ask not to be bound by rigid specifications that would limit the potential of our invention.

We claim:

1. A railway freight car coupler lifting device comprising:

a. base plate for supporting said device, a load bearing carried by and located substantially centrally of said base plate, a top plate spaced vertically above said base plate, an elongated rod having opposite end portions, one said end portion being journalled in said load bearing, a non-load bearing carried by and located substantially centrally of said top plate, said elongated rod passing through said non-load bearing and being laterally supported thereby to maintain said rod in its vertical position, a plurality of elongated spaced supports about said rod for rigidly connecting said top plate to said base plate and for maintaining said non-load bearing in vertical alignment with said load bearing, another of said end portions of said rod being screw threaded at least generally above said top plate, a metal block having an internally threaded passageway threadedly engaged with said other end portion of said rod, a lifting arm rigidly attached to and extending laterally of said block, a socket attached to said other end portion at its upper extremity adapted to be rotated by an impact power wrench for causing said block to move upwardly and downwardly along said rod said being maintained vertical by said bearings and spaced lateral support provided by said top and base plates even during lifting of a railway freight coupler.

2. The device of claim 1 further comprising a handle extending laterally of said block and substantially oppositely from said lifting arm, said handle being held by a hand of a user to permit relative rotation between said rod and said block, said handle being gripped by a hand of a user to readily lift and carry said device and position same beneath a railway freight car coupler.

* * * * *